US012283206B2

(12) United States Patent
Livingston et al.

(10) Patent No.: US 12,283,206 B2
(45) **Date of Patent: *Apr. 22, 2025**

(54) TAMPER-EVIDENT LABEL FOR BEVERAGES

(71) Applicant: Iconex LLC, Duluth, GA (US)

(72) Inventors: Timothy Darren Livingston, Corryton, TN (US); Shane Lamb, Bulls Gap, TN (US)

(73) Assignee: Iconex LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,184

(22) Filed: Feb. 10, 2023

(65) Prior Publication Data

US 2024/0161657 A1 May 16, 2024

Related U.S. Application Data

(63) Continuation-in-part of application No. 18/056,183, filed on Nov. 16, 2022.

(51) Int. Cl.
*G09F 3/00* (2006.01)

(52) U.S. Cl.
CPC .................................. *G09F 3/0292* (2013.01)

(58) Field of Classification Search
CPC .. G09F 3/0288; G09F 3/10; G09F 2003/0222; G09F 2003/023; G09F 2003/0267; G09F 2003/0273; B32B 3/266; B32B 7/06; B32B 7/12; B32B 37/12;
(Continued)

(56) References Cited

U.S. PATENT DOCUMENTS

| | | |
|---|---|---|
| 5,836,622 A | 11/1998 | Fabel |
| 6,276,725 B1 | 8/2001 | Laurash et al. |
| 8,568,847 B2 | 10/2013 | Brookshire et al. |

(Continued)

FOREIGN PATENT DOCUMENTS

| | | |
|---|---|---|
| EP | 3070701 | 9/2016 |
| JP | 2011170221 | 9/2011 |

(Continued)

OTHER PUBLICATIONS

Machine translation of JP 2011170221 A. (Year: 2011).*

(Continued)

*Primary Examiner* — Patricia L. Nordmeyer
(74) *Attorney, Agent, or Firm* — Schwegman Lundberg & Woessner, P.A.

(57) ABSTRACT

A tamper-evident label for a beverage cup is provided. The label includes a top portion, a bottom portion, and a middle portion defined within a label substrate. A second middle portion corresponding to the middle portion of the label substrate is defined in a liner substrate. Die cuts in the label substrate separate the top and bottom portions from the middle portion. The middle portion and the second middle portion separate together from the label as a single unit along the die cuts while the top portion and the bottom portion remain adhered to sides of the cup. Once the middle portion and the second middle portion are separated from the label, they are not capable of being reattached to the cup, which provides tamper-evident visual evidence of potential tampering with an opening of the cup to a consumer.

15 Claims, 9 Drawing Sheets

(58) Field of Classification Search
CPC ............ B32B 38/0004; B32B 2519/00; B65D 25/205; B65D 2401/05
See application file for complete search history.

(56) References Cited

U.S. PATENT DOCUMENTS

| | | | |
|---|---|---|---|
| 8,889,205 | B2 | 11/2014 | Sierra-gomez et al. |
| 2015/0001223 | A1 | 1/2015 | Spreck et al. |
| 2019/0114946 | A1 | 4/2019 | Holyoak et al. |
| 2020/0126452 | A1 | 4/2020 | Shinkle, II et al. |
| 2021/0061531 | A1 | 3/2021 | Pinkstone et al. |
| 2022/0013041 | A1 | 1/2022 | Francoeur et al. |
| 2024/0161656 | A1 | 5/2024 | Livingston et al. |

FOREIGN PATENT DOCUMENTS

| | | | | | |
|---|---|---|---|---|---|
| JP | 3194260 | | | 10/2014 | |
| JP | 3194260 | U | * | 11/2014 | |
| JP | 2016204033 | A | * | 12/2016 | |
| WO | WO-2022077118 | A1 | * | 4/2022 | G09F 3/0288 |
| WO | WO-2024107380 | A1 | | 5/2024 | |
| WO | WO-2024168258 | A2 | | 8/2024 | |

OTHER PUBLICATIONS

Machine translation of JP 3104907 U. (Year: 2004).*
Machine translation of JP-3194260-U (Year: 2014).*
Machine translation of JP 2016204033 A. (Year: 2016).*
"U.S. Appl. No. 18/056,183, Final Office Action mailed Jul. 2, 2024", 12 pgs.
"U.S. Appl. No. 18/056,183, Response filed Jun. 13, 2024 to Non Final Office Action mailed Mar. 13, 2024", 8 pgs.
"International Application Serial No. PCT/US2024/015191, International Search Report mailed Jul. 17, 2024", 5 pgs.
"International Application Serial No. PCT/US2024/015191, Written Opinion mailed Jul. 17, 2024", 8 pgs.

* cited by examiner

TAMPER-EVIDENT LABEL FOR BEVERAGES

RELATED APPLICATIONS

This application is a continuation-in part (CIP) of and claims priority to co-pending application Ser. No. 18/056,183, filed Nov. 16, 2022, entitled “Tamper Evident Label for Items;” the disclosure of which is hereby incorporated by reference in its entirety.

BACKGROUND

Labels can also be used as security and health safety mechanisms to provide evidence that prepared food was not tampered with between the time it was packaged and delivered to the consumer. For the most part, these type of labels are placed over bag or container openings such that in order to open the bag or container the label is broken. Most of these techniques are often unsuccessful because the labels can be carefully removed, the bag opened, and the labels resealed over the openings of the bags. Thus, consumers have little comfort in such labels and realize that their food may still have been tampered with.

Some containers have seals placed under a cap such that when a cap is removed and the seal is not present, the consumer knows that the contents should not be used as they may have been tampered with. This type of label/seal is frequently used on over-the-counter pharmaceutical products such as acetaminophen, juice, milk, etc. Another approach with some bottled beverages is to integrate a tamper-evident mechanism into the bottle cap itself. For example, a tab is pulled off the cap to open the beverage and a portion of the prefabricated cap is disposed of, and a smaller portion of the cap remains so the consumer can reseal the beverage for storage. Sometimes the throw-away portion remains as a separate component on the neck of the bottle, which is the case for bottled water, sodas, etc. A consumer can visibly discern whether the bottle was opened or not when the separate component is no longer fully integrated into the replaceable cap.

SUMMARY

In various embodiments, tamper-evident labels and a method for manufacturing tamper-evident labels are provided. Specifically, and in an embodiment, a liner-label combination is provided for a tamper-evident label. The label is defined by die cuts made in the label substrate and the liner substrate. Label die cuts in the label substrate outline the label and separate the label into a top portion, a middle portion, and a bottom portion. Die cuts in the liner substrate correspond and align to the middle portion of the label substrate for purposes of defining a middle liner portion within the liner substrate.

When the label is separated from the liner-label combination, backsides of the top portion and the bottom portion include adhesive, and the middle portion is adhered to the middle liner portion such that a backside of the middle liner portion is adhesive and residue free and represents a backside of the liner substrate. When the label is applied to a beverage cup, the middle portion with attached middle liner portion is placed over an opening in the cup and the top and bottom portions are pulled down and adhered to sides of the cup sealing the opening in the cup with the label.

When the label is removed from the opening the middle portion and the middle liner portion separate from the label along the die cuts in the label substrate of the label and the middle portion and the middle liner portion separate together as a single unit or piece from the label revealing the opening in the cup. Once the middle portion and the middle liner portion are removed from label, they cannot be reattached to the cup without visible evidence of prior separation. This provides tamper-evident visual evidence to a consumer as to whether an opening in a cup was tampered with or exposed to potential contamination.

DETAILED DESCRIPTION

As stated above, labels are used for a variety of purposes. Yet, there appears to be very few label solutions for beverage cups or containers that do not come with premanufactured caps or lids. These type of beverages are typically served for immediate consumption by consumers at fast food restaurants, regular sit-down restaurants, coffee shops, bars, etc. These types of beverages are susceptible to contamination, since from the time they are poured until the time they are delivered to the consumer, the liquid in the cup is exposed through the opening. This is particularly a problem in bars because of the trend where nefarious individuals have been known to slip drugs into drinks of customers.

Additionally, inattentive employees can place their fingers in a beverage opening when handing the beverage to a consumer, which becomes an obvious health hazard for the consumer. Moreover, after COVID19 consumers are more health conscious about how their food is prepared, handled, and delivered. Consumers want assurances and piece of mind that prepackaged and delivered food and drink are free of contamination and safe for their consumption.

These issues are solved with the tamper-evident label provided herein and below. A liner-label combination is provided with a tamper-evident label defined thereon customized for beverage containers having lids and an opening in the lid for drinking by the consumer. The tamper-evident label is peeled away from a combined label substrate and liner substrate for application. The tamper-evident label is then placed over an opening in the beverage container so that a middle portion of the tamper-evident label creates a seal over the opening in the beverage container. Two ends of the tamper-evident label adhere to the sides of the beverage container. The two ends are portions of the label substrate with adhesive coated on the backside of the label substrate to adhere to the sides of the beverage container. The middle portion includes a portion of the label substrate adhered to a portion of the liner substrate. A backside of the middle portion is a backside of the liner substrate and is adhesive free, such that no adhesive residue makes contact with the lid and opening of the beverage container. A flap in one end allows the consumer to grasp the flap and peel the middle portion off of the beverage opening or lid. During peeling, die cuts in the label substrate tear away such that the two ends remain adhered to the sides of the beverage container. Any attempt to expose the opening or lid of the beverage container causes the middle portion to break free such that it cannot be carefully reassembled. The consumer has irrefutable evidence when the opening or the lid were exposed or tampered with.

Figure 1A:
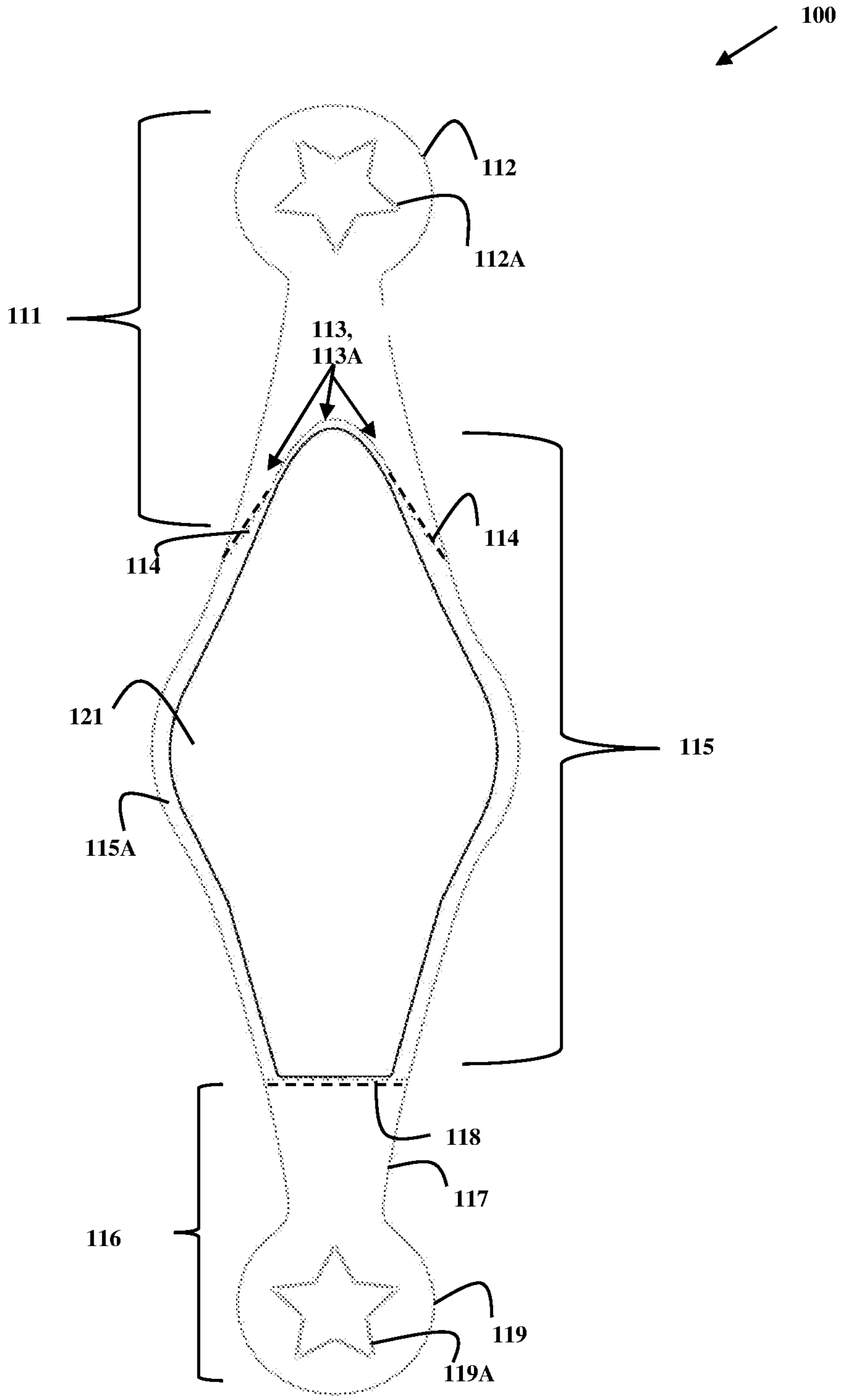
FIG. 1A is a diagram of a front side of a liner-label combination for a tamper-evident label, according to an example embodiment.

FIG. 1A is a diagram of a front side of a liner-label combination for a tamper-evident label 100, according to an example embodiment. Tamper-evident label 100 includes a top potion 111, a middle portion 115, a bottom portion 116, and a liner substrate portion 121. The middle portion 115 includes a portion 115A of a label substrate 110 and the liner substrate portion 121 separated from a liner substrate 120.

The top portion 111 includes a first end 112, a second end 113, and side die cuts 114 along two sides of the second end 113. The side die cuts 114 are adjacent to a top of middle portion 115 and extend at an angle out to outer edges of the tamper-evident label 100. The first end 112 and second end 113 form a barbell shape (e.g., a circle at the top of first end 112 and a narrow neck that widens in the direction of the second end 113 with the second end 113 shaped in an oval semi circle).

Second die cuts 113A is made through both the label substrate 110 and the liner substrate 120. Second die cuts 113A because of the shape and dimensions of tamper-evident label 100 break and extend up when label 100 is placed over an opening of a beverage cup creating a flap that can be grasped by a consumer and pulled up, at which time die cuts 114 made in just the label substrate 110 cause top portion 111 to break completely free of middle portion 115.

Middle portion 115 is bulbed shaped for purposes of fully extending over sides of a lid for a beverage container and substantially or completely covering an opening of the beverage container. This structure and shape is customized to seal and secure lids and openings of beverage containers or cups ensuring the lids and openings are adhesive free when the middle portion 115 of the tamper-evident label 100 is peeled away and the opening of the beverage cup is accessible for drinking by a consumer.

Bottom portion 116 includes a first end 117 and a second end 119. Again bottom portion 116 is barbell shaped with the second end 119 shaped in an oval or circle and the first end 117 extending from the bottom of the overall or circle to a second die cut 118 made in the label substrate 110. Notably, the first end 117 ends in a straight line rather than the semi circle associated with the top portion 111. The second die cut 118 is adjacent to a bottom of the middle portion 115 and the bottom of the middle portion 115 is also a straight line.

In an embodiment, the first end 112 of the top portion 111 includes imaged or printed indicia, graphics, or symbols. As illustrated in FIG. 1A, a star symbol 112A is imaged or printed on the first end 112 of top portion 111. In an embodiment, the star symbol 112A if formed as a perforation such that when the tamper-evident label 100 is separated from the liner substrate 120 and label substrate 110, the perforation separates from the label substrate 110 and remains adhered to the liner substrate 120 leaving an aperture in the shape of the symbol or design 112A in the top portion 111. In an embodiment, the symbol or design 112A is manufactured as an aperture such that there is no label substrate 110 corresponding to the symbol or design.

Similar to the first end 112 of the top portion, the second end 119 of the bottom portion 116 can include the printed or imaged indicia, perforation, etc. So, a symbol or graphic design 119A can be printed, imaged, perforated to create an aperture in the shape of the symbol or design 119A, manufactured such that the label substrate 110 has an aperture in the shape of the symbol or design 119A on the second end 119 of the bottom portion 116.

Figure 1B:
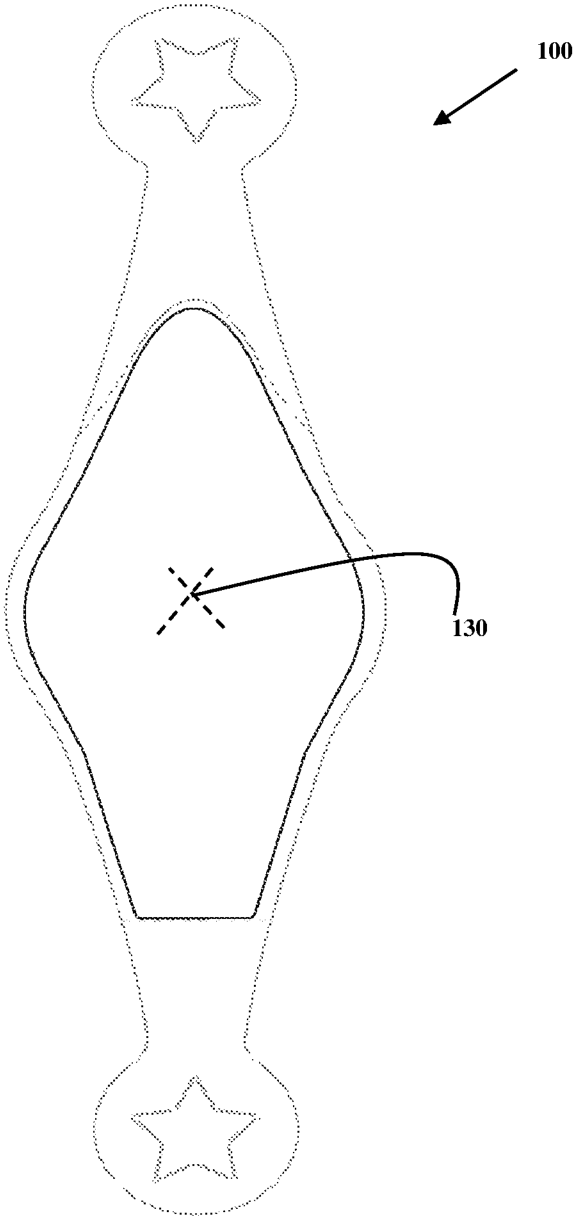
FIG. 1B is a diagram of a front side of another liner-label combination for a tamper-evident label, according to an example embodiment.

FIG. 1B is a diagram of a front side of another liner-label combination for a tamper-evident label 100, according to an example embodiment. Tamper-evident label 100 includes center perforations or die cuts 130 in a center of middle portion 115. The die cuts 130 are made in the label substrate 110 and the liner substrate 120. This permits a consumer with a beverage cup that does not permit drinking unless the lid is removed to poke a straw through die cuts 130 and uses a straw to drink the beverage. Any damage caused by poking die cuts 130 are visible to the customer, so the consumer has visible evidence when a straw, finger, or other object was used to break the seal formed by die cuts 130. This embodiment may be particular useful to consumers who prefer to use a straw with their beverages, such consumers may even user their own personal straws when the business does not supply straws as a matter of course.

Figure 1C:
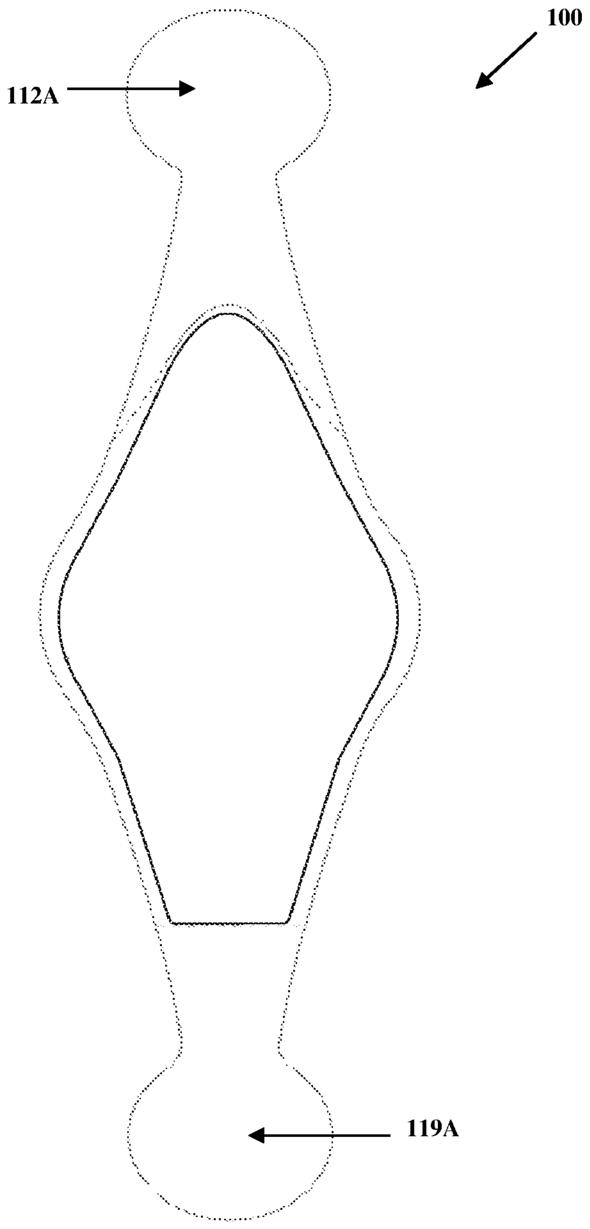
FIG. 1C is a diagram of a front side of yet another liner-label combination for a tamper-evident label, according to an example embodiment.

FIG. 1C is a diagram of a front side of yet another liner-label combination for a tamper-evident label 100, according to an example embodiment. Tamper-evident label 100 is devoid of any symbol or graphic design on the first end 112 of the top portion 111 in area 112A and devoid of any symbol or design on the second end 119 of bottom portion 116 in area 112A.

It is also to be noted that just one end of either the top portion 111 or the bottom portion 116 can include a thermal print coating, a symbol, and/or a graphic design while the other end includes no such coating, symbol, and/or graphic design in areas 112A and 119A. Thus, any combination of embodiments discussed with FIGS. 1A-1C can be achieved with the teachings presented herein with respect to the first end 112 of the top portion 111 and the second end 119 of the bottom portion 116 in areas 112A and 119A.

Figure 2A:
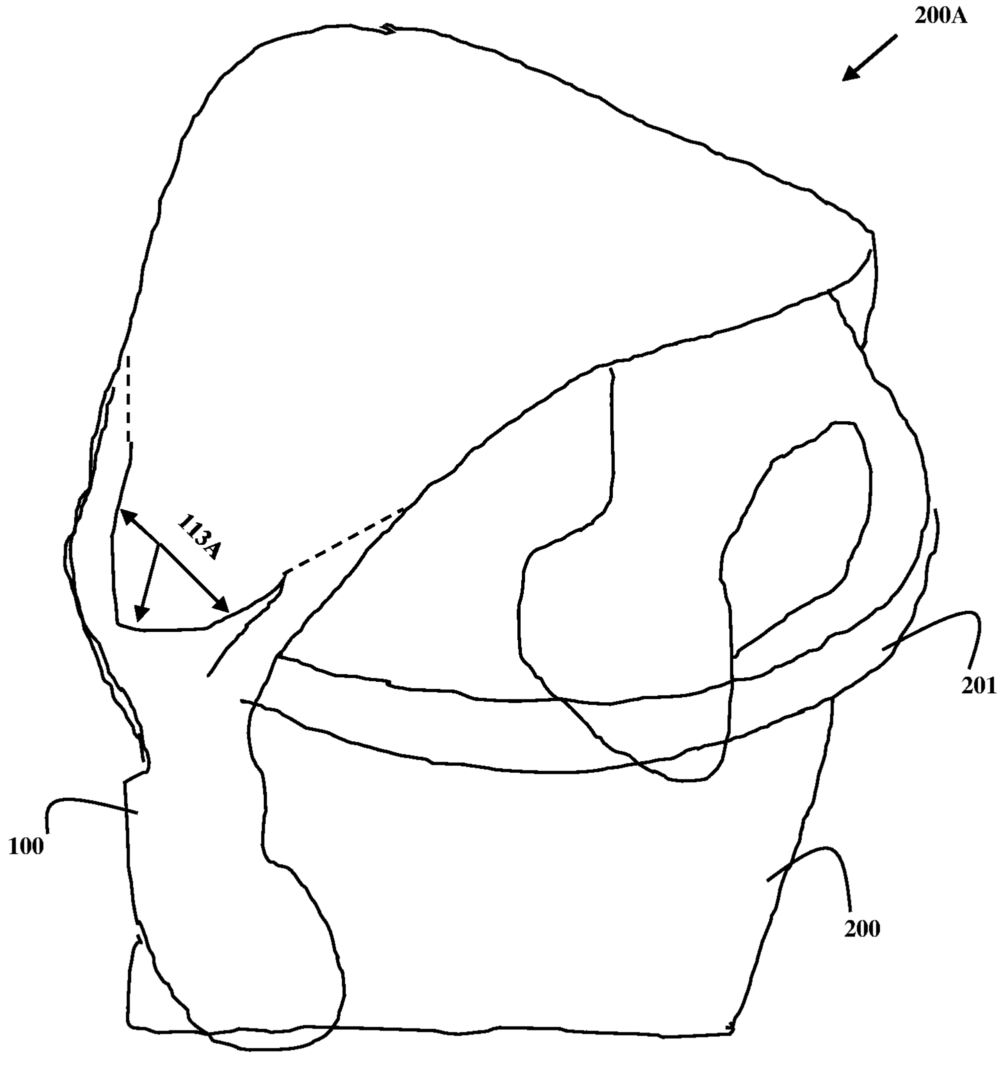
FIG. 2A is a diagram of a liner-label combination of FIG. 1A, 1B, or 1C covering an opening of a cup, according to an example embodiment.

FIG. 2A is a diagram 200A of a liner-label combination of FIG. 1A, 1B, or 1C covering an opening of a cup, according to an example embodiment. Tamper-evident label 100 is sealed to a lid 201 of a cup 200. The top portion 111 is adhered to a first side of cup 200 while bottom portion 116 is adhered to an opposite side of cup 200. Die cuts 113A made in both the liner substrate 120 and the label substrate 110 pop up or flare up creating a flap that is completely separated from the tamper-evident label 100 when label 100 is placed on the cup as illustrated.

When a consumer grasp the flap defined by die cuts 113A and pulls up, top portion 111 and bottom portion 116 remained adhered to the sides of the cup 200 and separate from middle portion 115 along die cuts 114 and 118 (die cut 118 not visible in FIG. 2A but is illustrated in FIG. 1A).

Since middle portion 115 includes both a label substrate portion 115A and a liner substrate portion 121, the opening 201 was in contact with a backside of the liner substrate 120. The backside of the liner substrate 120 is adhesive free and residue free, thus no adhesive or other residue is left on the lid 201 of cup 200.

Once a consumer pulls up on the flap defined by die cuts 113A, die cuts 114 and 118 separate from middle portion 115 and cannot be reapplied. Thus, if the opening of cup 200 was exposed before being in possession of the consumer, the consumer will have visible evidence of tampering.

Figure 2B:
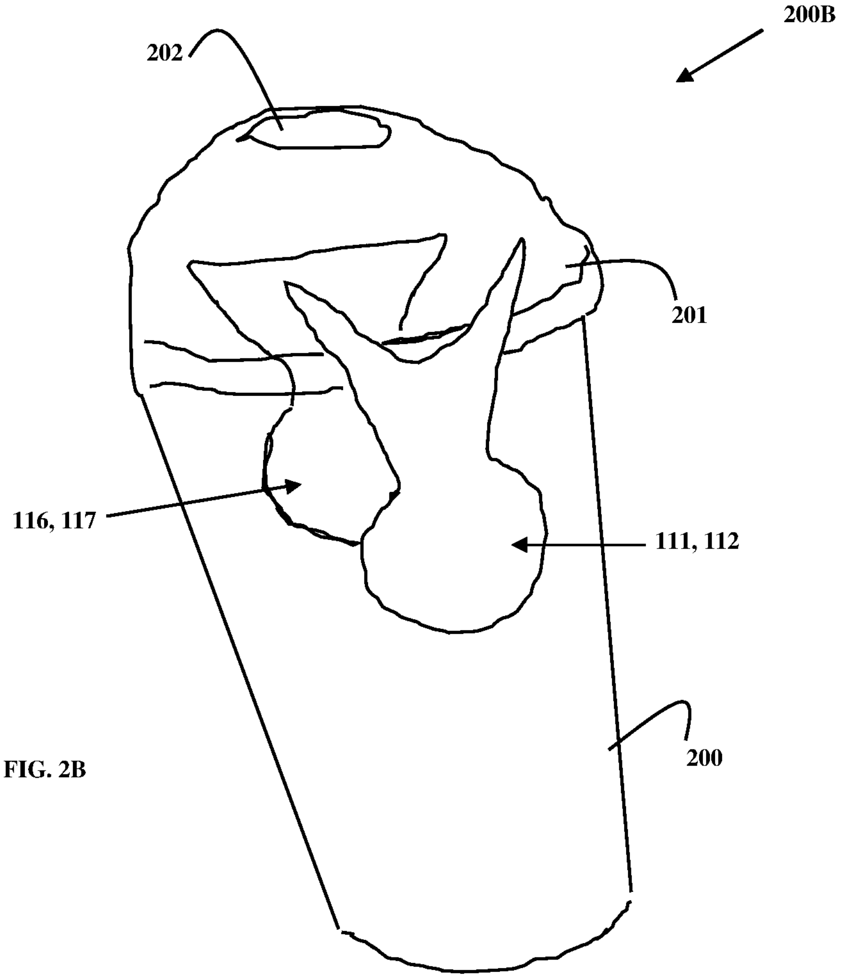
FIG. 2B is another diagram the cup of FIG. 2A after a portion of the tamper-evident label has been peeled off the surface of the cup to expose an opening on a lid of the cup for drinking, according to an example embodiment.

FIG. 2B is another diagram 200B the cup of FIG. 2A after a portion 115 of the tamper-evident label 100 has been peeled off the surface of the cup 200 to expose an opening 202 on a lid 201 of the cup 200 for drinking, according to an example embodiment. Diagram 200B illustrates a condition or state of the cup relative to opening 202 after middle portion 115 is separated from the tamper-evident label 100. Top portion 111 and bottom portion 116 remained adhered to sides of cup 200 and the first end 112 of top portion 111 and the second end 117 of the bottom portion 116 are visible should any imaged/printed indicia, symbol or graphic design be present.

Figure 3:
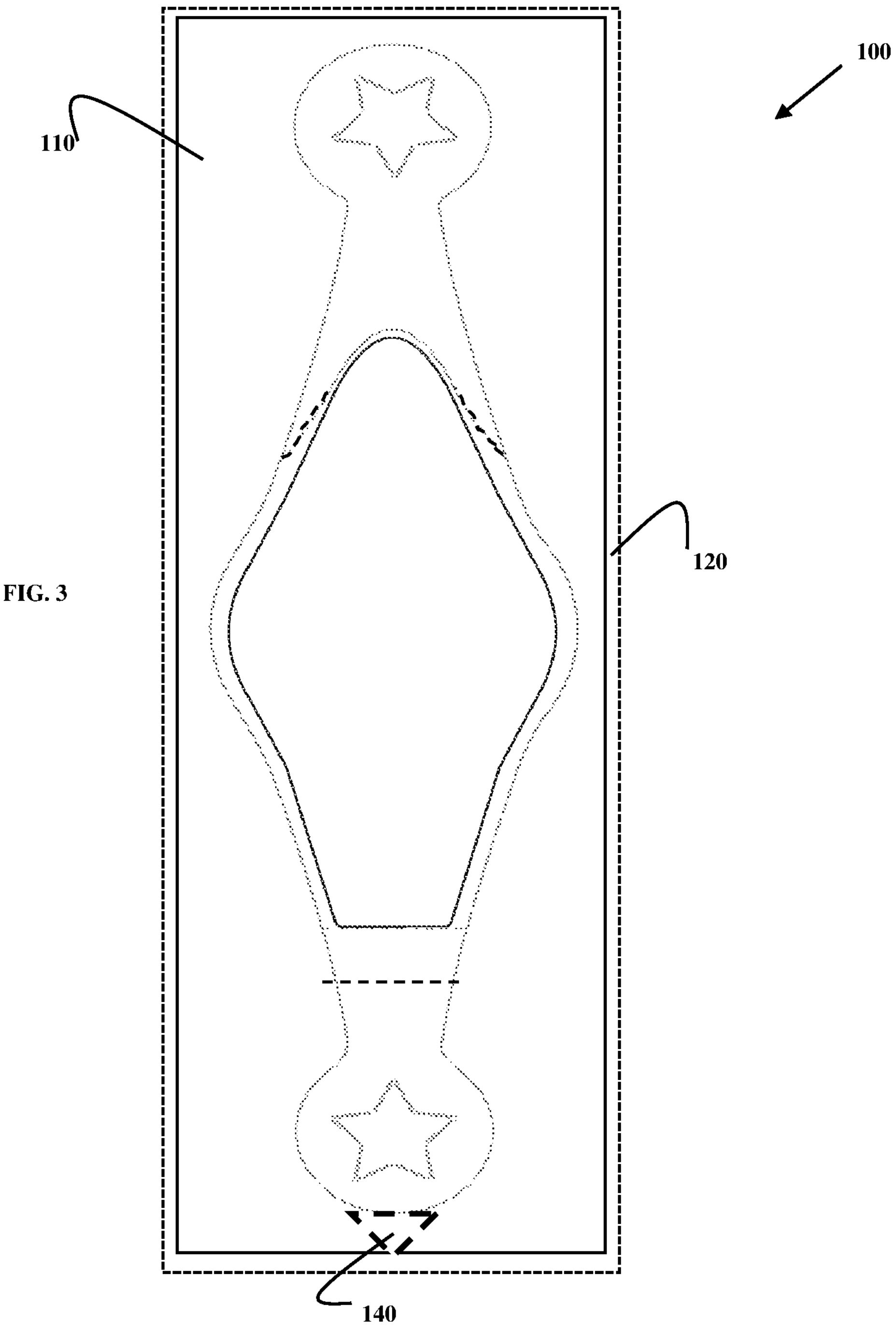
FIG. 3 is a diagram of a tamper-evident label that illustrates the label substrate and liner substrate with the tamper-evident label defined thereon, according to an example embodiment.

FIG. 3 is a diagram of a tamper-evident label 100 that illustrates the label substrate 110 and liner substrate 120 with the tamper-evident label 100 defined thereon, according to an example embodiment. Tamper-evident labels 100 can be manufactured in rolls of the label substrate 110 and the liner substrate 120 aligned and adhered together in sheets would in a roll. The roll can be fed to a thermal, laser, or dot matrix printer for imaging a front side of the label substrate 110, such as on the top portion 111 and/or bottom portion 116 as was discussed above.

Optionally, the sheets of label substrate 110 and liner substrate 120 include a tab 140 that permits the tamper-evident label 100 defined in the label substrate 110 and liner substrate 120 to be separated from each sheet.

Figure 4:
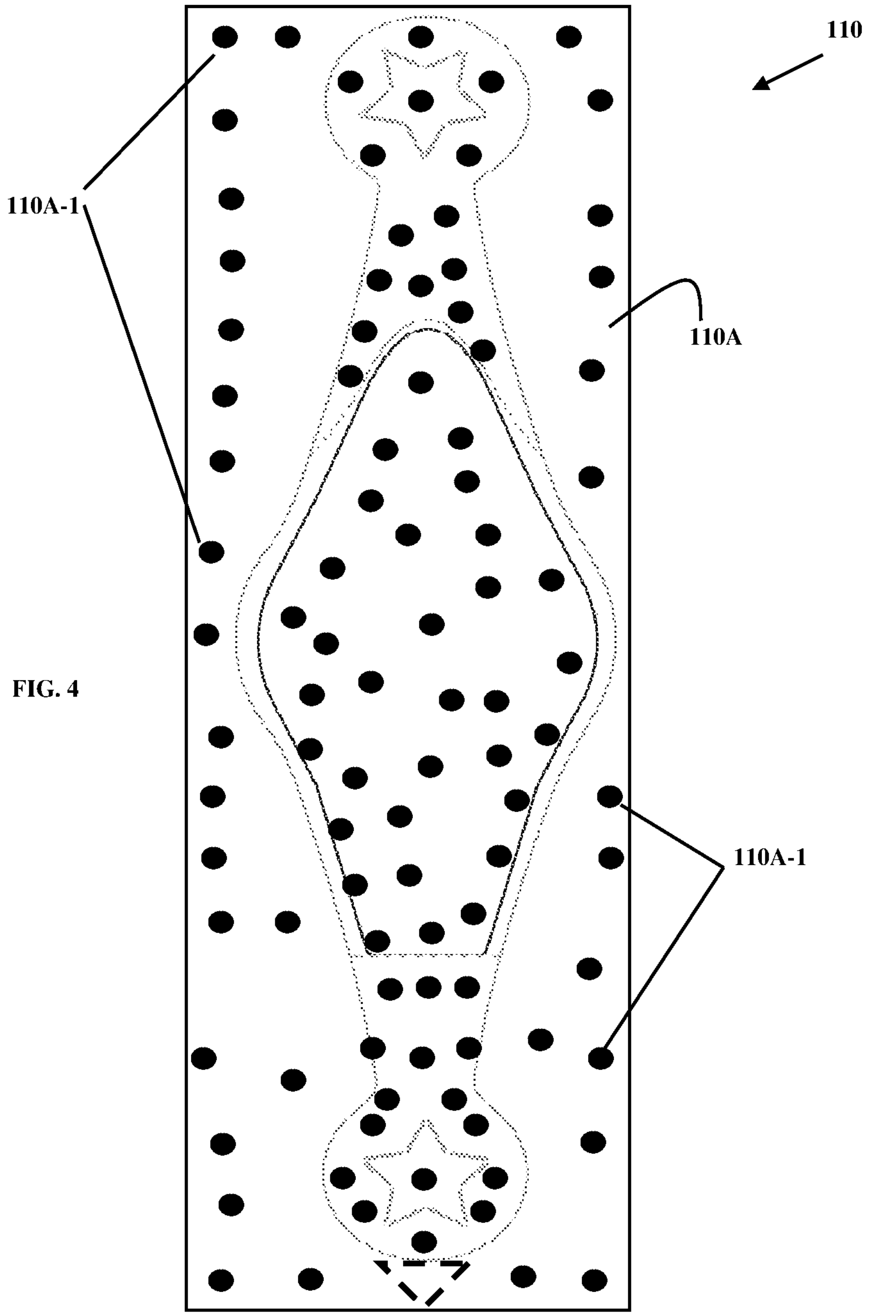
FIG. 4 is a diagram of a backside of the label substrate with adhesive deposited thereon, according to an example embodiment.

FIG. 4 is a diagram of a backside 110A of the label substrate 110 with adhesive 110A-1 deposited thereon, according to an example embodiment. Adhesive can be uniformly coated on backside 110A or coated in adhesive patches and/or patterns of adhesive. Notice that no adhesive is applied in an area defined by tab 140. Tab 140 is also die cut through label substrate 110.

Figure 5:
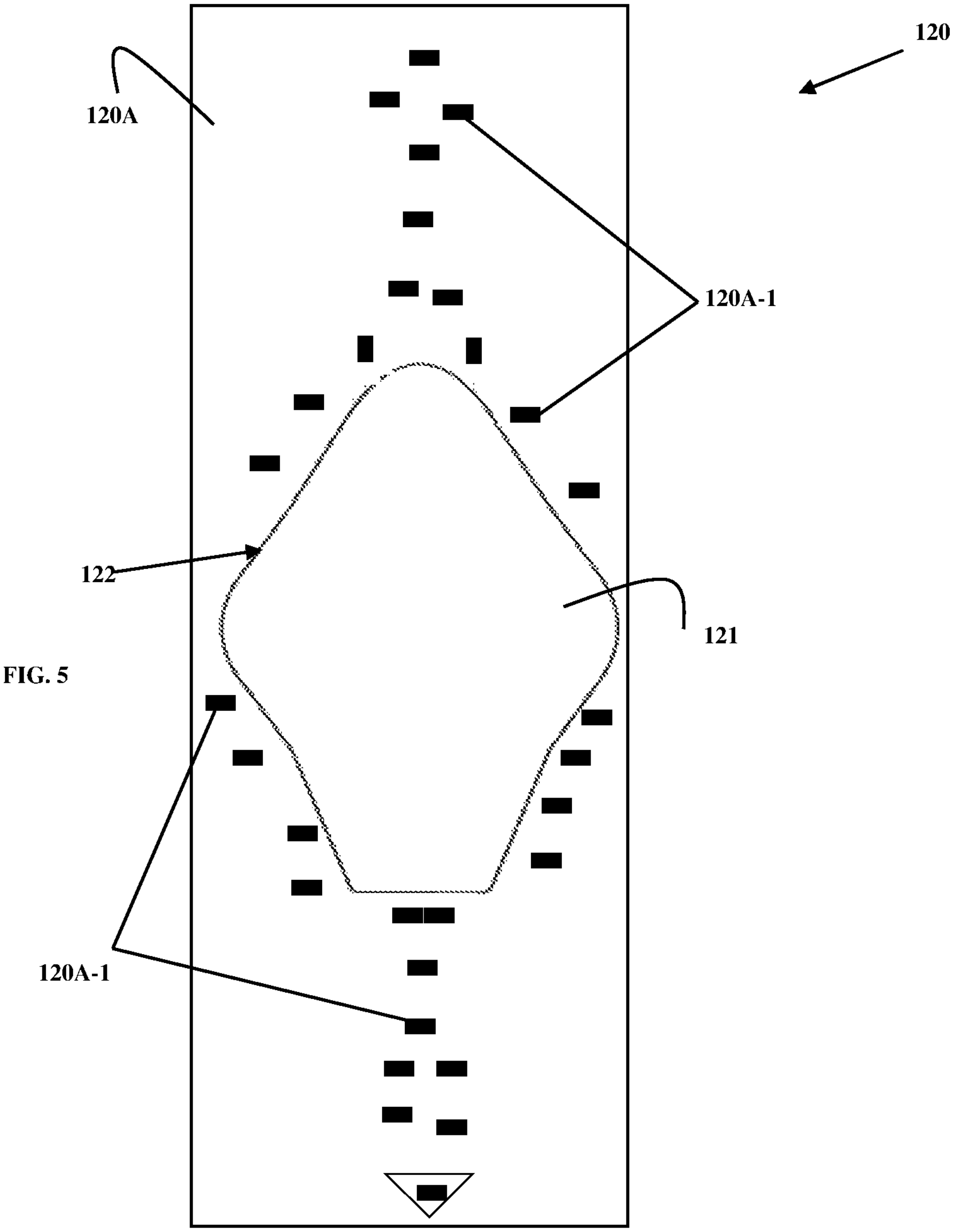
FIG. 5 is a diagram of a frontside of the liner substrate with a release coating selectively deposited thereon along with a perforated liner portion, according to an example embodiment.

FIG. 5 is a diagram of a frontside 120A of the liner substrate 120 with a release coating 120A-1 selectively deposited thereon along with a perforated liner portion 121, according to an example embodiment. Die cuts 122 are made in liner substrate 120 to define liner portion 121 which corresponds to label middle portion 115A. Notice frontside 120A of liner substrate 120 does not include and is devoid of any release coating 120A-1 in areas that correspond to liner portion 121. This ensures that when middle portion 115 is separated from top portion 111 and bottom portion 116, liner portion 121 remains adhered to label substrate middle portion 115A as a single unit or piece that is separated from label 100. Moreover, the backside of liner portion 121 covers and seals an opening 202 of a cup and the backside of liner portion 121 is adhesive and residue free, such that the cup 200 includes no stickiness when handled by the consumer for drinking a beverage from cup 200.

It is to be noted that although a disposable cup 200 was illustrated above in FIGS. 2A and 2B, the embodiments of the tamper-evident label 100 can include other types of cups, glasses, and bowls that include an opening from which a beverage or food is accessible to a consumer. The tamper-evident label 100 can include customized sizes and dimensions to accommodate different sized openings in beverage cups, and/or bowl containers.

In an embodiment, a roll of liner-label combinations is provided in a web or roll with a plurality of individual tamper-evident labels 100. The roll is fed to a printer for thermal imaging or printing of customized indicia for each individual tamper-evident label 100.

In an embodiment, the tamper-evident labels 100 are applied to fast food, restaurant, and coffee shop beverages. The front side of the labels 100 can be imaged or printed with custom indicia indicating the order number of the customer and the type of drink. Additionally, the middle portion 115A can be imaged or printed with custom indicia for promotional offers. The consumer removes the middle portion 115A and 121 as a single separated piece of label 100 to drink the beverage and can retain the promotional offer for subsequent use. The middle portion 115A, the top portion 111, and/or the bottom portion 116 can be thermal imaged or printed with custom indicia for advertisements of retailers and viewing by the consumer.

In an embodiment, any advertisements or promotional offers can be pre-printed or pre-imaged on the tamper-evident label 100 with another portion custom thermal imaged or printed with custom indicia by a printer using one or more thermal, dot matrix, or laser coatings applied to a frontside of the label substrate 110.

Figure 6:
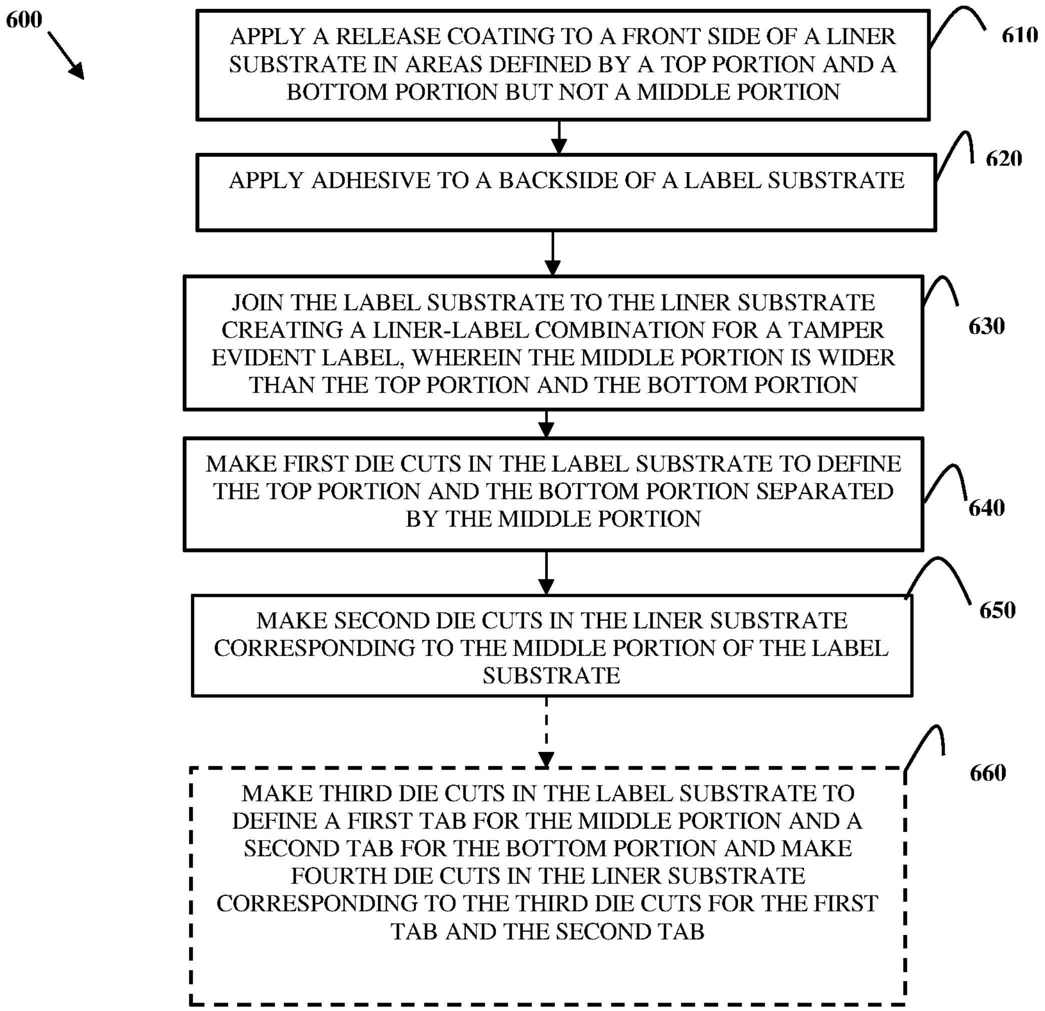
FIG. 6 is a diagram of a method of manufacturing the liner-label combination for a tamper-evident label, according to an example embodiment.

FIG. 6 is a diagram of a method 600 of manufacturing the liner-label combination 100 for a tamper-evident label 100, according to an example embodiment. The method is implemented on a press through firmware that controls electromechanical components of the press to manufacture a label-liner combination 110 with a tamper-evident label 100 as described herein and above. A processor associated with the firmware executes the firmware to perform the method and to control the electromechanical components of the press.

At 610, the press applies a release coating 110-2 to a front side of a liner substrate 120A-1 in areas defined by a top portion 111 and a bottom portion 116 but not in other areas that correspond to a middle portion 115. This allows the middle portion 115A to remain adhered to the corresponding portion 121 of the liner substrate 120 while the top portion 111 and bottom portion 116 separate from the liner substrate 120 when the label substrate 110 is peeled off the liner substrate 120 creating a hole in the liner substrate 120 in an area that corresponds to the middle portion 121.

At 820, the press applies adhesive 110A-1 to a backside 110A of a label substrate 110. The adhesive 110A-1 deposited uniformly to the backside 110A or applied in patterns and/or patches. In an embodiment, the adhesive 110A is a microsphere adhesive that is adapted to adhere to wet surfaces.

At 830, the press joins the label substrate 110 to the liner substrate 120, creating a liner-label combination for a tamper-evident label 100. The middle portion 115 is wider than the top portion 111 and the bottom portion 116. In an embodiment, the middle portion 115 is bell shaped. In an embodiment, the bell shape includes two bell shapes with a top of the first bell shape oriented towards the top potion 111, a top of the second bell shape oriented towards the bottom portion 116, and the bottoms or bases of the two bell shapes adjoined to one another; this was illustrated above in FIGS. 1A, 1B, 1C, and 3-5.

At 840, the press makes first die cuts 114 and 118 in the label substrate 110 to define the top portion 111 in the label substrate 110 and the bottom portion 116 in the label substrate 110. The first die cuts also outline the tamper-evident label 100 within the label substrate 110. The top portion 111 in the label substrate 110 and the bottom portion 116 in the label substrate 110 separated by the middle portion 115A of the label substrate 110.

At 850, the press makes second die cuts 122 in the liner substrate 120 corresponding to the middle portion 115A of the label substrate 110. The second die cuts 122 outline the middle portion 115A in the label substrate 110 under the 111 of the label substrate 110 and above the bottom portion 116 of the label substrate 110.

In an embodiment, at 850, the press makes third die cuts 113A in the label substrate 110 to define a first tab 113 for the middle portion 115 and a second tab 140 for the bottom portion 116. The press further makes fourth die cuts in the liner substrate corresponding to the third die cuts 113A for the first tab 113 and the second tab 140.

In an embodiment, a front side of the label substrate 110 is precoated with a thermal activated image or print coating. In an embodiment, the thermal activated image or print coating is applied or deposited on the front side 100A of the label substrate 110 by the press. The coating can be applied to just one of, all of, or some combination of the first portion 111, the middle portion 115A, and/or the bottom portion 116.

Although the present invention is described with particular reference to certain preferred embodiments thereof, variations and modifications of the present invention can be affected within the spirit and scope of the following claims.

The invention claimed is:

1. A liner-label combination, comprising:
- a label substrate with first die cuts in the label substrate defining a top portion, a middle portion, and a bottom portion, wherein the label substrate includes second die cuts that separate the middle portion from the first portion and the bottom portion;
- a liner substrate with third die cuts in the liner substrate defining a liner middle portion that corresponds to and aligned with the middle portion of the tamper-evident label; and
- a tab to separate the tamper-evident label with the liner middle portion adhered to the middle portion along the first die cuts and the third die cuts from the label substrate and the liner substrate as a tamper-evident label;
- wherein the tamper-evident label adapted to cover an opening of a beverage lid for a beverage cup with the middle portion and the liner middle portion over the beverage lid and the opening and with backsides of the top portion and the bottom portion adhered to sides of the beverage cup;
- wherein the middle portion and the liner middle portion adapted to separate as a single unit from the tamper-evident label when attached to the beverage cup along the second die cuts;
- wherein the middle portion includes a thermally sensitive image coating for thermally imaging indicia, symbols, or graphics on at least a portion of the middle portion.

2. The tamper-evident label of claim 1, wherein the tamper-evident label further includes fourth die cuts along a top center corresponding to the middle portion in the label substrate and the liner middle portion in liner substrate.

3. The tamper-evident label of claim 2, wherein the fourth die cuts define a flap that flares up above a surface of the tamper-evident label when the tamper-evident label is attached to the beverage cup and covers the opening of the beverage lid.

4. The tamper-evident label of claim 3, wherein the flap when pulled up away from the surface separates the middle portion and the liner middle portion from the tamper-evident label and exposes the opening of the beverage lid.

5. The tamper-evident label of claim 1, wherein the tamper-evident label is one of a plurality of tamper-evident labels wound in a roll, wherein the roll adapted to be inserted in a printer for imaging at least a portion of a frontside of the label substrate corresponding to the first portion, the middle portion, and the bottom portion.

6. The tamper-evident label of claim 5, wherein at least the at least a portion of the frontside includes a thermally sensitive ink coating, and the printer is a thermal printer.

7. A tamper-evident label, comprising:
- a top portion, a middle portion, and a bottom portion die cut in a label substrate;
- a liner middle portion die cut in a liner substrate and aligned with the middle portion of the label substrate;
- a first die cut to define a flap made in both the liner substrate and the liner substrate at a top end corresponding to the middle portion and the liner middle portion;
- second die cuts in the label substrate that extend from the first die cut to sides of the label substrate; and
- a third die cut in the label substrate that separates the bottom portion from the middle portion;
- wherein backsides of the top portion, middle portion, and the bottom portion include adhesive;
- wherein a front side of the liner substrate includes a release coating in areas that correspond with the backsides associated with the top portion and the bottom portion but not the middle portion;
- wherein the tamper-evident label adapted to fit over an opening of a container with the middle portion aligned over the opening and secured by the adhesive of backsides of the top portion and the bottom portion to sides of the container to seal the opening;
- wherein the flap is adapted to extend upward when the tamper-evident label is adhered to the container;
- wherein the second die cuts and the third die cut are adapted to break away from the tamper-evident label when the flap is pulled upward separating the middle portion and the liner middle portion as a single unit and exposing the opening in the container;
- wherein the middle portion includes a thermally sensitive image coating for thermally imaging indicia, symbols, or graphics on at least a portion of the middle portion;
- wherein the middle portion and the liner middle portion are bell shaped, including two bell shapes, a first bell shape oriented with a top toward the top portion and a second bell shape oriented with a top toward the bottom portion and bases of the two bell shapes adjoined together.

8. The tamper-evident label of claim 7, wherein the middle portion and the liner middle portion are wider than the top portion and the bottom portion.

9. The tamper-evident label of claim 7, wherein the second die cuts taper from ends of first die cut to the sides of the label substrate.

10. The tamper-evident label of claim 7, wherein at least a portion of a frontside of the label substrate for the tamper-evident label includes a thermally sensitive image coating for terminally imaging indicia, symbols, or graphics on the at least a portion.

11. The tamper-evident label of claim 7 further comprising, fourth die cuts in a center corresponding to middle portion and the liner middle portion made through the label substrate and the liner substrate.

12. The tamper-evident label of claim 11, wherein the fourth die cuts are shaped in an X and adapted to puncture the center of the middle portion and the liner middle portion when a straw is pushed through to the opening of the cup.

13. The tamper-evident label of claim 7, wherein the third die cut extends in a straight horizontal line across the tamper-evident label to separate the bottom portion from the middle portion within the label substrate.

14. The tamper-evident label of claim 7, wherein an end of the bottom portion includes a tab die cut in the label substrate to remove the tamper-evident label from a sheet of the label substrate and liner substrate.

15. The tamper-evident label of claim 7, wherein the adhesive on the backsides of the top portion, middle portion, and bottom portion is deposited in a uniform coating, a pattern coating, or as patches of adhesive.

* * * * *